United States Patent Office 3,383,413
Patented May 14, 1968

3,383,413
RECOVERY OF ADIPIC ACID FROM A CYCLO-HEXANE OXIDATE MIXTURE WITH 1,2-DICHLOROETHANE
Fred Jaffe, Rockville, Md., assignor to W. R. Grace & Co., New York, N.Y., a corporation of Connecticut
No Drawing. Filed Jan. 3, 1964, Ser. No. 335,683
1 Claim. (Cl. 260—537)

ABSTRACT OF THE DISCLOSURE

In abstract, this invention is directed to a method for recovering adipic acid from cyclohexane oxidate mixtures, said mixture comprising adipic acid, glutaric acid, succinic acd, and minor amounts of other dibasic and monobasic acids, as well as non-oxidized and partially oxidized cyclohexane, reaction solvents, catalyst residues, and various amounts of unresolved tars and color forming agents, said method comprising removing volatile ingredients of the oxidate mixture by evaporation, and extracting the non-volatile portion of said oxidate mixture with 1,2-dichloroethane to obtain a solid substantially pure adipic acid.

---

The present invention relates to the production of adipic acid, and more specifically to an improved process for recovering substantially pure adipic acid from cyclohexane oxidate mixtures.

It has long been known that cyclohexane may be oxidized with molecular oxygen or nitric acid to obtain good yields of dibasic acids. These oxidations produce complex oxidate mixtures which comprise adipic, glutaric, succinic and minor amounts of other dibasic and monobasic acids, as well as non-oxidized and partially oxidized cyclohexane, reaction solvents, catalyst residues and various amounts of unresolved tars and color forming agents.

It is frequently desirable to recover from the oxidate mixtures substantially pure adipic acid wh'ch is substantially free from other dibasic acids and discoloring impurities. Traditionally recovery of adipic acid from oxidates on a large scale basis has been done by fractional crystallization. However, due to the simi'arities of solubilities of homologous dibasic acids and the tenacity with which color-forming tars follow and form during the crystallization procedures, consistently high yields of high grade adipic acid are difficult to obtain. Frequently, it is found that prior art adipic acid crystallization recovery processes result in the production of first, second and third grade material, judged on basis of color and homologous acid content which result from first, second and third crystal crops respectively. For numerous consumers, such as the plastics and food industries, only first grade product is acceptable. The second and third grade products must first be subjected to comp'icated and expensive co'or improving purification procedures, or sold at a considerably reduced price.

It is therefore an object of the present invention to provide an improved method for recovering adipic acid from cyclohexane oxidate mixtures.

It is another object to provide a method by which high grade adipic acid may be recovered from a cyclohexane oxidate mixture in a single procedure which recovers substantially all the adipic acid therein without repeated processing steps.

These and still further objects of the present invention will become readily apparent to one skilled in the art from the following detailed description and specific examples.

Broadly, the present invention contemplates a method for recovering adipic acid from a cyclohexane oxidate mixture which comprises first removing substantially all the volatiles from the oxidate, preferably by evaporative distillation under reduced pressure, and secondly, extracting the non-volatile residue with 1,2-dichloroethane to remove substantially all non-volatile impurities from the adipic acid therein.

More specifically, I have made the surprising discovery, that 1,2-dichloroethane is a specific solvent for the non-volatile impurities present in an adipic acid oxidate resulting from the oxidation of cyclohexane. In other words, when the non-volatile residue of a cyclohexane oxidation product is extracted with 1,2-dichloroethane at temperatures ranging from about 20° to about 80° C. the 1,2-dichloroethane will selectively dissolve and extract impurities such as homologous dibasic acids as well as color forming tar-like materials, substantially without dissolving and carrying away the adipic acid. Thus, it is found that upwards of 95% adipic acid may be recovered from a given oxidate using my novel process. This adipic acid has a purity on the order of 98%.

Cyclohexane oxidates which may be treated in accordance with the present invention, may be obtained by oxidizing cyclohexane with either molecular oxygen in the presence of suitable catalysts and solvents, or oxidizing cyclohexane with nitric acid. Both such oxidations are well known to those skilled in the art. In a typical molecular oxygen oxidation, cyclohexane is admixed wi.h a suitable solvent such as acidic acid and an oxidation catalyst, such as cobalt napthenate and/or manganese acetate, and subjected to the action of molecular oxygen, either in the form of air or substantially pure oxygen, at temperatures on the order of 100° to 200° C. This oxidation results in the formation of an oxidate containing 30% adipic acid, around 10% other dibasic and monobasic acids, and considerable amounts of semi-oxidation products, such as cyclohexanone and cyclohexanol. The oxidate mixture also contains a substantial amount of non-reacted cyclohexane as well as considerable color-forming materials in the form of higher polymeric tar-like materials. In order to obtain a high-grade adipic acid, it is generally found that substantially all the homologous acids, as well as the color producing tar-like materials must be substantially removed. When the oxidation is conducted using nitric acid as the oxidizing agent, the oxidate mixture will comprise excess nitric acid, adipic acid wth homologous dbasic and monobasic acids, as well as non-reacted cyclohexane, and certain amounts of semi-oxidized produc's.

When an oxidation has been conducted using molecular oxygen as the oxidizing agent, the resulting oxidate mixture will normally form 2 layers upon standing. The upper layer comprises non-polar materials, such as non-oxidized cyclohexane and certain par ially oxidized products soluble therein. The lower layer consists primarily of polar type materials including adipic acid, homologous acids, and any acid material such as acetic acid used as a solvent during the reaction. This lower layer also contains varying amounts of color-forming tar-like materials and water which are invariably produced during the course of the reaction. In the event nitric acid has been used as the oxidizing agent, the lower polar layer will also include substantial amounts of non-reac'ed nitric acid.

In a generally preferred embodiment of the present invention, the upper non-polar layer or fraction is separated from the lower layer before the volatile products or components of the oxidate are removed. This may be done by a simple decantation procedure. Separating the polar and non-polar layers simplifies the subsequent removal of volatiles from the fraction containing the adipic acid. This separation is not absolutely critical. However, since the upper layer contains very little adipic acid and consists primarily of non-reacted cyclohexane, removal of the upper layer reduces the volume which must be subjected to evaporation.

The oxidate mixture, preferably subsequent to removal of the upper non-polar layer, is then subjected to an evaporation procedure whereby substantially all the volatiles present are removed. This evaporation step is preferably performed at temperatures below about 120° C., at pressures ranging from about 1 to about 200 millimeters mercury. During the evaporation procedure volatile components, such as water, acetic acid if present, certain amounts of cyclohexane and cyclohexyl acetate, and other possible volatile ingredients as cyclohexanol and cyclohexanone are removed. Preferably, the evaporation is accompanied with suitable fractionation means so as to recover any materials of value. The evaporation is conducted at temperatures below about 120° C. so as to discourage formation of higher polymeric tar-like materials and loss of adipic acid through such reactions.

Subsequent to removing all the volatile materials from the oxidate the non-volatile residue is extracted with 1,2-dichloroethane at a temperature from about 20° to 80° C. It is found that the 1,2-dichloroethane selectively extracts substantially all the homologous acids as well as most of the color forming tar-like materials. The precise amount of 1,2-dichloroethane required to perform a given extraction will depend to some extent on the composition of the non-volatile residue. When there is a large proportion of homologous acids and tar-like materials in comparison with the adipic acid present, more 1,2-dichloroethane is required, than when only minor amounts of these materials are in the mixture. Generally speaking, it is found that from about 1 to about 10 parts by weight 1,2-dichloroethane will effectively extract one part by weight non-volatile residue. While the extraction may be successfully conducted by extracting the residue with a single portion of 1,2-dichloroethane, it is generally preferred to extract the mixture with successive fractional amounts of the 1,2-dichloroethane used. Generally, when the above parts by weight 1,2-dichloroethane are used per part of non-volatile residue, splitting this amount of 1,2-dichloroethane into 3 or 4 separate fractions will serve to more thoroughly extract the impurities from the non-volatile mixture, than if this amount is used at one time.

The extraction procedure is conveniently done by vigorously admixing the non-volatile residue with 1,2-dichloroethane and subsequently filtering the mixture to recover the adipic acid as a substantially pure solid product. Repeating the extraction procedure with the 1,2-dichloroethane, will serve to enhance the purity of the adipic acid up to a point wherein the solid filter cake comprises in excess of 98% adipic acid having an extremely light color. The melting point of the adipic acid purified in this manner is generally on the order of 153°–154° C. When the adipic acid is tested for color in a typical polyester color test, it is found that Gardner color values on the order of one are readily obtainable. The adipic acid prepared in accordance with the present recovery process is in itself a high quality product. However, it is understood that if a more highly purified product is required the solid material recovered from the extraction may be recrystallized from a suitable solvent. This recrystallization procedure is relatively simple due to the fact that the majority of the impurities have been removed by the prior extraction process.

Having described the basic aspects of the present invention, the following example is given to illustrate embodiments thereof.

Example

A 2 kg. reaction mixture comprising 30% by weight acetic acid, 69% cyclohexane, 1% cyclohexanone, and 25 p.p.m. cobaltnaphthanate and manganese acetate each was placed in a vented stainless steel autoclave. The mixture was heated to 120° C., with stirring and a 1:1 mole ratio mixture of oxygen: nitrogen was passed into the reactor. The pressure within the reactor was maintained at 120 p.s.i.g. The incoming gas flow and venting of the reactor was controlled so as to maintain an oxygen concentration in the off gas of about 5%. This oxidation was continued for 2 hours.

The cyclohexane oxidate mixture obtained above was permitted to stand until 2 layers formed. The lower layer which weighed 1185 grams was treated in a rotary film evaporator to remove volatiles at a temperature of 70°–90° C. and a pressure of 20 millimeters of mercury. The non-volatile residue was washed with 4 200 milliter portions of 1,2-dichloroethane. Upon the final filtration a solid white crystalline cake was obtained. From the initial 1185 grams of lower layer oxidate which contained 19.9% adipic acid, a 228 gram filter cake was obtained. This amounted to a 96.5% recovery from the oxidate material. This adipic acid melted at 153.0 to 153.6° C. and upon analysis was found to contain 98.7% adipic acid. The dry cake was tested for color using a standard polyester color test and yielded a Gardner color value of 1.

The above example clearly illustrates that the present extraction process may be effectively used to recover substantially pure adipic acid from a crude cyclohexane oxidate mixture. The adipic acid obtained by this process is suitable for formation of numerous polymeric materials such as polyamides and polyesters as well as plasticizer compositions.

I claim:

1. A method for recovering adipic acid from a cyclohexane oxidate mixture, wherein said mixture results from molecular oxygen oxidation of cyclohexane, and wherein said mixture consists of a polar phase and an essentially non-polar phase, said method comprising:

(a) separating said mixture into its respective polar and essentially non-polar phases by decantation;

(b) removing volatile ingredients from the polar phase by evaporation at temperatures below about 120° C. under pressures from about 1–200 millimeters of mercury; removing substantially all non-volatile impurities, said impurities comprising (i) glutaric, succinic and other dibasic acids, (ii) catalyst residues, and (iii) unresolved tars and color forming agents by (c) extracting the non-volatile portion of said polar phase with about 1–10 parts by weight of 1,2-dichloroethane per part by weight of non-volatile oxidate at a temperature of from about 20–80° C. to obtain solid, substantially pure adipic acid.

References Cited

UNITED STATES PATENTS

| | | | |
|---|---|---|---|
| 2,824,134 | 2/1958 | Hill et al. | 260—533 |
| 2,870,203 | 1/1959 | Cyphers et al. | 260—537 |

LORRAINE A. WEINBERGER, *Primary Examiner.*

V. GARNER, *Assistant Examiner.*